United States Patent [19]
Haruta et al.

[11] Patent Number: 5,976,448
[45] Date of Patent: Nov. 2, 1999

[54] OPTICAL FORMING APPARATUS FOR FORMING THREE-DIMENSIONAL OBJECTS

[75] Inventors: Yuichi Haruta, Tsuchiura; Ayao Matsumura, Yokkaichi; Tsuyoshi Watanabe, Tsukuba; Takashi Ukachi, Ushiku, all of Japan

[73] Assignees: DSM N.V., Heerlen, Netherlands; JSR Corporation; Japan Fine Coatings Co., Ltd., both of Tokyo, Japan

[21] Appl. No.: 09/198,397

[22] Filed: Nov. 24, 1998

Related U.S. Application Data

[63] Continuation of application No. PCT/NL97/00299, May 28, 1997.

[30] Foreign Application Priority Data

May 29, 1996 [JP] Japan ..................................... 8-134511

[51] Int. Cl.$^6$ .......................... B29C 35/08; B29C 41/02
[52] U.S. Cl. ..................... 264/401; 425/135; 425/174.4; 425/375
[58] Field of Search .................................. 264/40.1, 308, 264/401; 425/135, 174.4, 375

[56] References Cited

U.S. PATENT DOCUMENTS 5,051,334  9/1991  Fan .
5,248,249  9/1993  Yamamoto et al. .
5,525,051  6/1996  Takano .
5,609,814  3/1997  Takano .

FOREIGN PATENT DOCUMENTS

97/23342  7/1997  WIPO .

OTHER PUBLICATIONS

Derwent Abstract, DE 4414775, filed Oct. 19, 1995.
Derwent Abstract, DE4417083, filed Nov. 23, 1995.
Derwent Abstract, DE4305201, filed Apr. 7, 1994.
Derwent Abstract, JP 05 286040, filed Nov. 2, 1993.
Derwent Abstract, JP 06 246837, filed Sep. 6, 1994.
Derwent Abstract, JP 04 118221, filed Apr. 20, 1992.
Derwent Abstract, JP 08 150662, filed Oct. 31, 1995.

*Primary Examiner*—Leo B. Tentoni
*Attorney, Agent, or Firm*—Pillsbury Madison & Sutro LLP

[57] ABSTRACT

An optical forming apparatus which can form a homogeneous three-dimensional object exhibiting desired properties over all parts, while effectively suppressing sedimentation of filler even though the filler is easily precipitated in a photo-curable resin composition. The optical forming apparatus can produce a three-dimensional object consisting of laminated layers of cured resin produced by repetition of forming cured resin layers by selectively irradiating a photo-curable liquid resin composition placed in a container (20), wherein the apparatus is characterized by having a means (60) for circulating the photo-curable liquid resin composition.

11 Claims, 3 Drawing Sheets

OPTICAL FORMING APPARATUS FOR FORMING THREE-DIMENSIONAL OBJECTS

This is a Continuation of International Appln. No. PCT/NL97/00299 filed May 28, 1997 which designated the U.S.

BACKGROUND OF THE INVENTION

1. Field of the Invention

The present invention relates to an optical forming process for forming three-dimensional objects.

2. Description of Related Art

A molding method has conventionally been known as the method for forming three-dimensional models from a resin. The molding method, however, requires a long period of time and significant costs to prepare a mold. In addition, a number of steps are required to complete a three-dimensional model, which make the process completed. To overcome these problems, an optical forming method which does not require a mold has been proposed (for example, Japanese Patent Applications Laid-open No. 35966/1987, No. 113925/1990, No. 64048/1994, and No. 125079/1995). This optical forming method comprises forming a cured resin layer (n) by selectively irradiating a non-cured layer (n) of a radiation- or photo-curable liquid resin according to a slice shape data (n) of a three-dimensional model, feeding the radiation- or photocurable liquid resin over this cured resin layer (n) to form a fresh, non-cured resin layer (n+1), selectively irradiating this non-cured layer (n+1) of a photo-curable liquid resin according to a slice shape data (n+1), and repeating this process, thereby obtaining a three-dimensional model consisting of laminated layers of the cured resin.

FIG. 2 is a drawing schematically showing a basic construction of an optical forming apparatus used for such a method. The apparatus comprises a fixed base (1), a container (2) in which a photo-curable resin (3) is contained, a light source apparatus (4) for irradiating the liquid surface of the photo-curable resin (3), and a stage (5) which supports the laminated object (6) of cured resin layers. The stage (5) is movable up and down. For example, when the stage (5) is moved downward from the position shown in FIG. 2, the photo-curable resin (3) is fed onto the surface (6A) of the laminated layer (6) to form a non-cured layer with a thickness corresponding to the descended distance of the stage (5).

One problem with this optical forming method is a considerably long period of time required for forming a great number of three-dimensional models with the same shape. Another problem is a limitation to the types of resin which can be applied to this method. This limitation leads to production of three-dimensional models which do not possess intended properties.

As a means to solve these problems, a forming method of a three-dimensional model has been proposed, which comprises fabricating a mold of a heat resistant resin by an optical forming method using a radiation-curable resin (such a mold is hereinafter called a "resin-made mold") and forming the target three-dimensional model using this resin-made mold from raw material resins which can exhibit intended characteristics. A great number of the three-dimensional models possessing the intended characteristics can be formed by this method without impairing the advantage of the simplicity in the optical forming process.

The addition of fillers to a photo-curable resin composition has been known from the patent applications JP-A-05286040, DE-A-4305201 and EP-A-393676 as an effective means for improving heat resistance and physical properties (reinforcing effects, . . . ) of a cured resin by an optical forming process. Inorganic fillers such as inorganic powder or inorganic fiber are given as examples of suitable fillers.

Because the fillers blended with a photo-curable resin composition usually have a density higher than that of the photo-curable resin, the fillers are easily sedimentated when the photo-curable resin composition is filled in the container. No optical forming objects (three-dimensional objects) with desired heat resistance and physical properties can be obtained from a photo-curable resin composition in which the fillers contained therein are dispersed only inadequately. When the state of dispersion of the fillers in the photo-curable resin composition in the container changes over time, particularly when the concentration of fillers decreases close to the liquid surface, the resulting optical forming object has different concentrations of the fillers in the lower part formed at the beginning of the forming and in the upper part which is formed close to the end of the optical forming operation. As a result, the properties of the resulting optical forming object is varied according to sections.

Further, the patent applications DE-A-4414775, DE-A-4417083 and JP-A-04118221 describe an optical forming apparatus for 3-dimensional models provided with a device to transfer an overflow of the resin composition back to the container in which the model is built.

SUMMARY OF THE INVENTION

Accordingly, an object of the present invention is to provide an optical forming process for forming a three-dimensional object which can effectively control sedimentation of fillers even when the fillers which are easily sedimentated are blended with a radiation-curable resin composition placed in a container, thereby manufacturing a homogeneous three-dimensional object which can exhibit the desired characteristics all over the sections.

Another object of the invention is to provide a process for the preparation of a three dimensional object having an improved heat resistance.

The objects have been achieved in the present invention by an optical forming apparatus for forming a three-dimensional object consisting of laminated layers of cured resin produced by repetition of forming cured resin layers by selectively irradiating a radiation-curable liquid resin composition placed in a container, wherein the apparatus is characterized by having a circulation device the radiation-curable liquid resin composition; and further by the use of this apparatus in a process for making objects having improved heat resistance.

The optical forming apparatus for forming three-dimensional objects of the present invention exhibits particularly excellent effects when a filler is blended and dispersed in the radiation-curable resin composition.

It is desirable that the optical forming apparatus for forming three-dimensional objects of the present invention be provided with a control means which can control operation of the circulation device.

The process of the invention for forming a three dimensional object comprises the steps of (a) introducing a uncured layer of a liquid radiation-curable liquid resin composition in an optical forming apparatus (b) selectively irradiating the non-cured layer of said radiation-curable resin according to a slice shape data of a three-dimensional object, to cure the selected area of resin.

(c) repeating said introducing and irradiating steps, thereby obtaining a three dimensional object consisting of laminated layers of cured resin wherein the photosensitive resin composition comprises a filler with a density different from the resin and wherein the resin composition is circulated by a circulation device at least for some time during the process.

DETAILED DESCRIPTION OF THE INVENTION AND PREFERRED EMBODIMENTS

The circulation device which constitutes an essential part of the optical forming apparatus of the present invention is a means for transferring the photo-curable resin composition which is present in the lower part of the container (close to the bottom) to the upper part (close to the liquid surface) of the container. This ensures to keep the state of dispersion of the filler in the photo-curable resin composition homogeneous all over the entire photo-curable resin composition present in the container by transferring the composition which is present in the lower part of the container where the concentration of the fillers tends to increase over time. At the same time, the state of dispersion of the filler at locations close to the liquid surface is stabilized. As a result, the three-dimensional object which is produced from cured resin layers formed in the vicinity of the liquid surface has excellent homogeneity and exhibits intended properties all over the sections.

Figure 1:
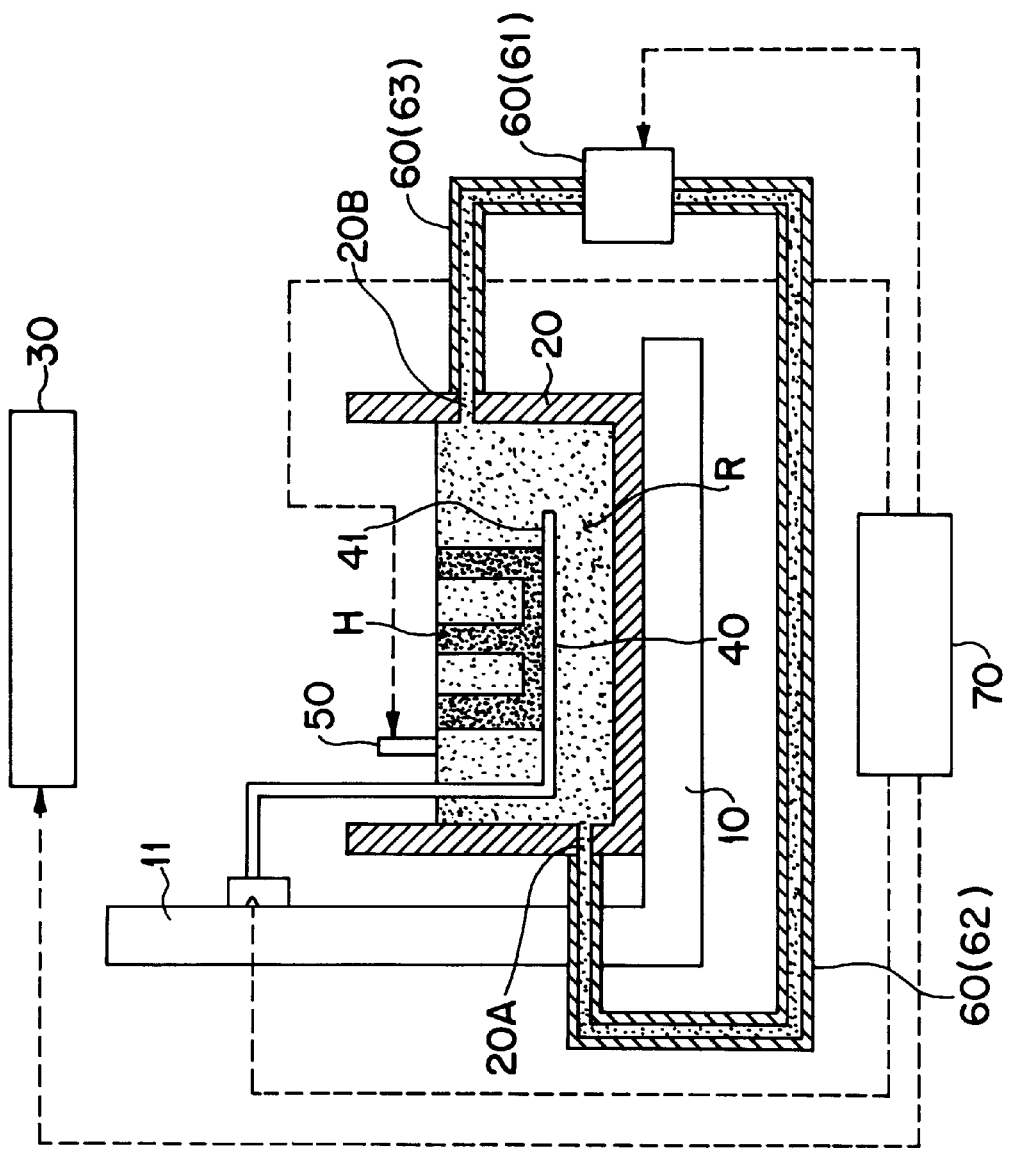
FIG. 1 is a schematic representation of one embodiment of an optical forming apparatus of the invention.
Figure 2:
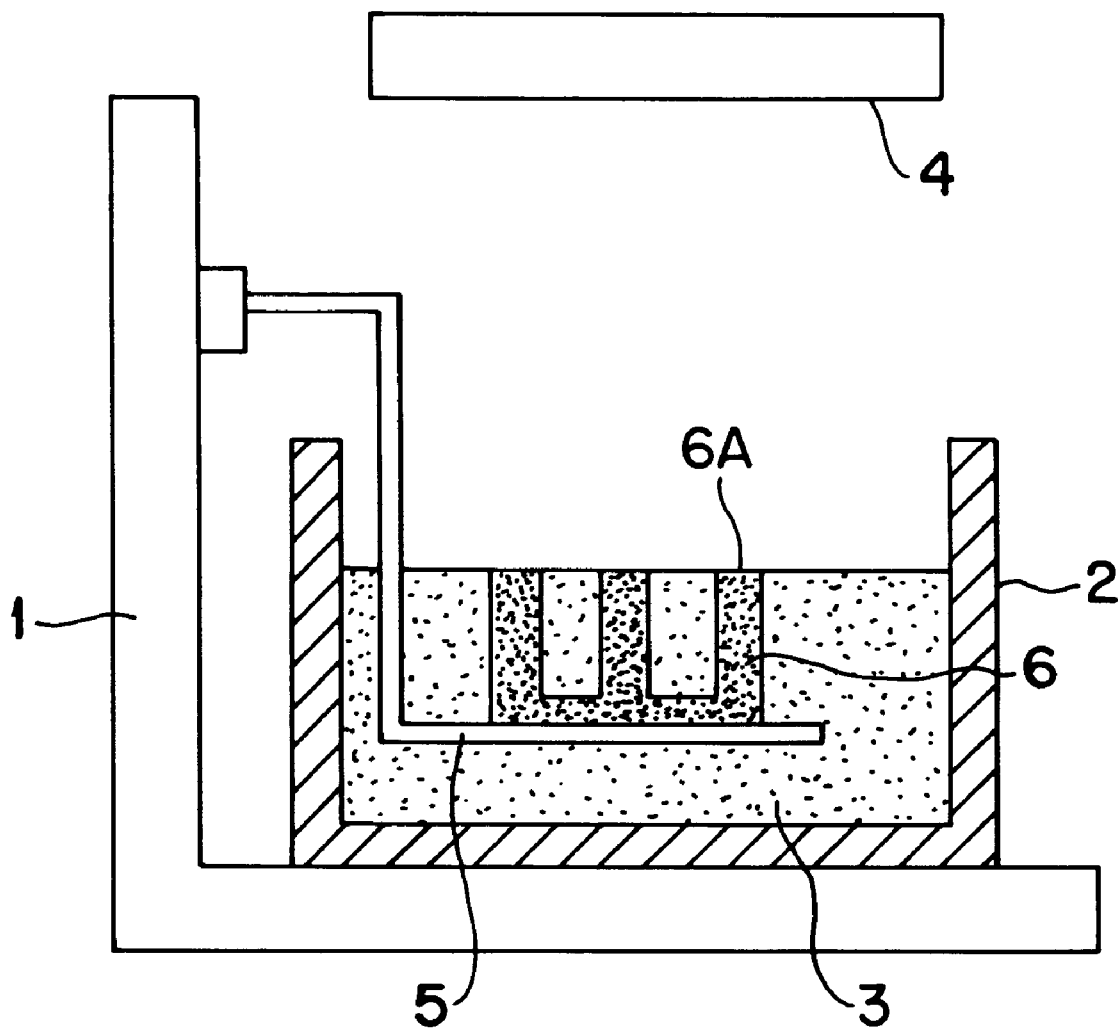
FIG. 2 is a schematic representation of a basic configuration of an optical forming apparatus used in the optical forming operation.

The optical forming apparatus for forming a three-dimensional object of the present invention will now be described in detail with reference to the drawings. FIG. 1 is a drawing for illustrating an embodiment of the optical forming apparatus in the present invention, which comprises a fixed base (10), a support column (11) vertically extending from the fixed base (10), a container (20) for a photo-curable resin composition R (hereinafter may be referred to from time to time as "composition R"), a light source device (30) for selectively irradiating the liquid surface of the composition R, a stage (40) which supports laminated layers H of cured resin layers, a stage surface (41), a wiping mechanism (50), a circulation means of the composition R (60), and a control means (70).

The container (20) is formed of a material which is not transparent (for example a metal such as stainless steel). The light source device (30) is provided with a light source part such as a laser beam oscillator or an ultraviolet radiation lamp (omitted from the drawing) and a light scanning mechanism or masking mechanism (omitted from the drawing) to selectively irradiate a part of the composition R.

The stage (40) is installed so as to be able to move up and down along the vertical supporting column (11). When the stage (40) is caused to move downward as shown in FIG. 1, the composition R is fed over the surface of the laminated layer H to form uncured layer with a thickness corresponding to the volume produced by the downward movement of the stage (40). The wiping mechanism (50) is a mechanism for making a flat and smooth surface of a layer of the uncured liquid photo-curable resin. This can be accomplished by first lowering the platform 1–10 mm, so that the complete surface of the cured layer is properly wetted, secondly, elevating the platform to the desired height and thirdly, wiping the excess resin to obtain a flat surface. It is also possible to have (some excess) resin sprayed over the surface of the cured layer, and thereafter wipe the excess away, or calandering or a doctor blade can be used.

The circulation means (60) comprises a circulating pump (61), pipe (62) on the liquid suction side, and pipe (63) on the liquid discharge side. Here, given as examples of the circulating pump (61) are a bellows-type pump, an eccentric screw pump, a rotary pump, a type of rotary pump with external, a gear pump, a diaphragm-type pump, and the like. Among these, the bellows-type pump, diaphragm-type pump, or circumferential piston are preferred due to the capability of transferring a highly viscous slurry, the possession of only small friction parts, and the capability of being operated with only slight generation of heat.

The pipe (62) on the liquid suction side links the opening (20A) formed on the lower part of the side wall for the container (20) and the circulating pump (61). The pipe (63) on the liquid discharge side links the circulating pump (61) and the opening (20B) formed on the upper part of the side wall for the container (20). The plurality openings of (20A) and (20B) are provided also diagonally in the horizontal direction (right and left, and before and behind of the paper) to increase the circulation effect (homogeneity of the composition) in the container (20).

The materials of construction for the circulating pump (61), the pipe (62) on the liquid suction side, and the pipe (63) on the liquid discharge side, in the sections where the liquid composition comes into contact are suitably selected according to the types of the photo-curable resins, the types and amounts of fillers dispersed, and the forming conditions such as the temperature of the composition, so as to prevent deterioration of the composition due to heat generation and high share, and to stand abrasion due to flow of filler and chemical attack of the photo-curable resin.

In addition to the circulation means (60), a spare circulation means having the similar configuration as the circulation means (60) shown in FIG. 1 can be provided to ensure a continuous optical forming operation without interruption when a malfunctioning trouble may be caused in the circulation means (60). Furthermore, it is possible to use plurality of circulation means at the same time to increase the circulation effect.

The control means (70) comprises a computer or the like to control operations of the light source device (30) (lighting-extinction-scanning-stopping), the stage (40) (rise-descent-stopping), the wiping mechanism (50) (actuation-stopping), and the circulation means (60) (actuation-stopping).

Given as examples of the photo-curable resins used as the resin component of the composition R are monomers and oligomers such as modified polyurethane (meth)acrylate, oligo-ester (meth)acrylate, urethane (meth)acrylate, epoxy (meth)acrylate, photosensitive polyimide, aminoalkyd, epoxy compounds, vinyl ether, oxetane, spiro-ortho-ester compounds, vinyl ether-maleic acid, and thiol-ene. These monomers and oligomers may be used either individually or in combination of two or more.

Other components which may be added to the composition R include a photoinitiator producing radicals or cations when irradiated with light, a preservative, and other additives which may improve the characteristics of the composition R.

Powdery inorganic fillers or fiber inorganic fillers can be given as the fillers which constitute the composition R. Specific examples include glass powder, silica powder, alumina, alumina hydrate, magnesium oxide, magnesium hydroxide, barium sulfate, calcium sulfate, calcium carbonate, magnesium carbonate, silicate mineral, kieselguhr, siliceous sand, silica powder, titanium oxide, aluminum powder, bronze, zinc powder, copper powder, lead powder, gold powder, silver dust, glass fiber, potassium titanate whiskers, carbon whiskers, sapphire whiskers, beryllia whiskers, carbonization boron whiskers, silicon carbide whiskers, and silicon nitride whiskers. The average particle size or the average fiber length of the inorganic fillers is usually in the range of 1–50 $\mu$m. The amount of the inorganic fillers to be incorporated into the composition R generally is in the range of 50–200 parts by volume, preferably 100–175 parts by volume, and in particular 140 to 160 parts by volumes for 100 parts by volumes of the mixture of the photo-curable resin.

A typical example of the composition R comprises 100 parts by volumes a resin mixture which consists of 50 parts by weight of SA-1002(tm) (manufactured by Mitsubishi Chemical Co., Ltd.) and 25 parts by weight of FA-513A(tm) (manufactured by Hitachi Chemical Co., Ltd.) as the photo-curable resin, 25 parts by weight of N-vinyl pyrrolidone, 0.25 parts by weight of Irgacure(tm) 184 (manufactured by Ciba Geigy) as the photopolymerization initiator, and 0.1 parts by weight of p-methoxy phenol as the stabilizing agent, 136 parts by volume of glass beads GB045ZC(tm) (manufactured by Toshiba Balotini)as the inorganic filler.

A three-dimensional object can be formed according to the following manner using the optical forming apparatus of the present invention with the configuration described above.

[1] A group of slice shape data calculated from CAD data of the three-dimensional object to be formed is input into the control means (70). Each slice having a certain prescribed interval in the direction of height of the three-dimensional object.

[2] Upon receiving control signals from the control means (70), the support stage (40) moves down a distance for causing the stage surface (41) to sink to a level equivalent to one layer from the liquid surface of the composition R. Then, the composition R is fed over the stage surface (41) to form an uncured layer (first layer) of the composition R.

[3] The wiping mechanism (50) is actuated by control signals from the control means (70), ensuring a smooth liquid surface of the composition R and a uniform thickness of the uncured layer (the first layer).

[4] The uncured layer (the first layer) is selectively irradiated with light from the light source device (30) according to the slice shape data (the data for the first layer) by the control means (70). The part of the composition R irradiated with light is cured by photopolymerization to form a cured resin layer (the first layer).

[5] The stage (40) comes down for a distance of another layer according to control signals from the control means (70). Then, the next uncured layer (the second layer) of the composition R is fed over the cured resin layer (the first layer).

[6] The wiping mechanism (50) is actuated according to the control signals from the control means (70), thereby ensuring a smooth liquid surface of the composition R and a uniform thickness of the uncured layer (the second layer).

[7] The uncured layer (the second layer) is selectively irradiated with light from the light source device (30) according to the slice shape data (the data for the second layer) by the control means (70). The part of the composition R irradiated with light is cured by photopolymerization to form a cured resin layer (the second layer).

[8] The operations [5] to [7], i.e. formation of an uncured layer, smoothing the liquid resin surface, formation of a cured resin layer, are repeated to produce a three-dimensional object consisting of laminated cured resin layers.

In the optical forming apparatus of the present invention, the composition R is circulated, that is, the composition which is present close to the bottom is transferred to the liquid surface, by means of the circulation means (60), while the optical forming operation of the three-dimensional object is being carried out or as a pre-treatment step before such a forming operation is initiated. Specifically, out of the composition R filled in the container (20), the composition which is present close to the bottom where the percentage of the fillers tends to increase with time, is transferred outside the container (20) from the opening (20A), and circulated to the piping (62) on the liquid suction side, circulating pump (61), and piping (63) on the liquid discharge side, and returned to the container (20) from the opening (20B). This ensures mixing of the composition which is present close to the bottom of the container, containing fillers at high density, with the composition which is present in the vicinity of the liquid surface. As a result, a uniformly density of the fillers in the composition R can be maintained all over the container, thereby stabilizing the density of the fillers in the vicinity of the liquid surface and suppressing the change (decrease) in the density over passage of time. Accordingly, in the three-dimensional object consisting of laminated cured resin layers formed in the vicinity of the liquid resin surface, the concentration of the fillers is even in the loweL resin layers formed at the initial stage of the forming operation and the upper resin layers formed close to the end of the forming operation. As a result, the three-dimensional object obtained exhibits excellent homogeneity in the properties all over the part.

Because the opening (20A) and the opening (20B) formed in the container (20) are opposedly arranged in the horizontal direction, the circulation effect (homogeneity of the composition) in the container (20), particularly the homogeneity in properties of the same cured resin layer, is greatly improved.

The circulation means (60) which constitutes an essential part of the optical forming apparatus of the present invention need not necessarily be operated throughout all the forming operation, but may be intermittently operated so as to maintain a desirable circulation effect. For example, the circulation means (60) may be stopped to prevent the liquid surface from undulating while the wiping mechanism (50) is operated, to make the liquid surface smooth, and while the composition is being cured by light irradiation. Such an intermittent operation of the circulation means (60) can be controlled by the control means (70).

The quantity of the composition transported by the circulation means (60) per unit time (the capacity of the circulating pump (61)) can be estimated as follows.

Figure 3:
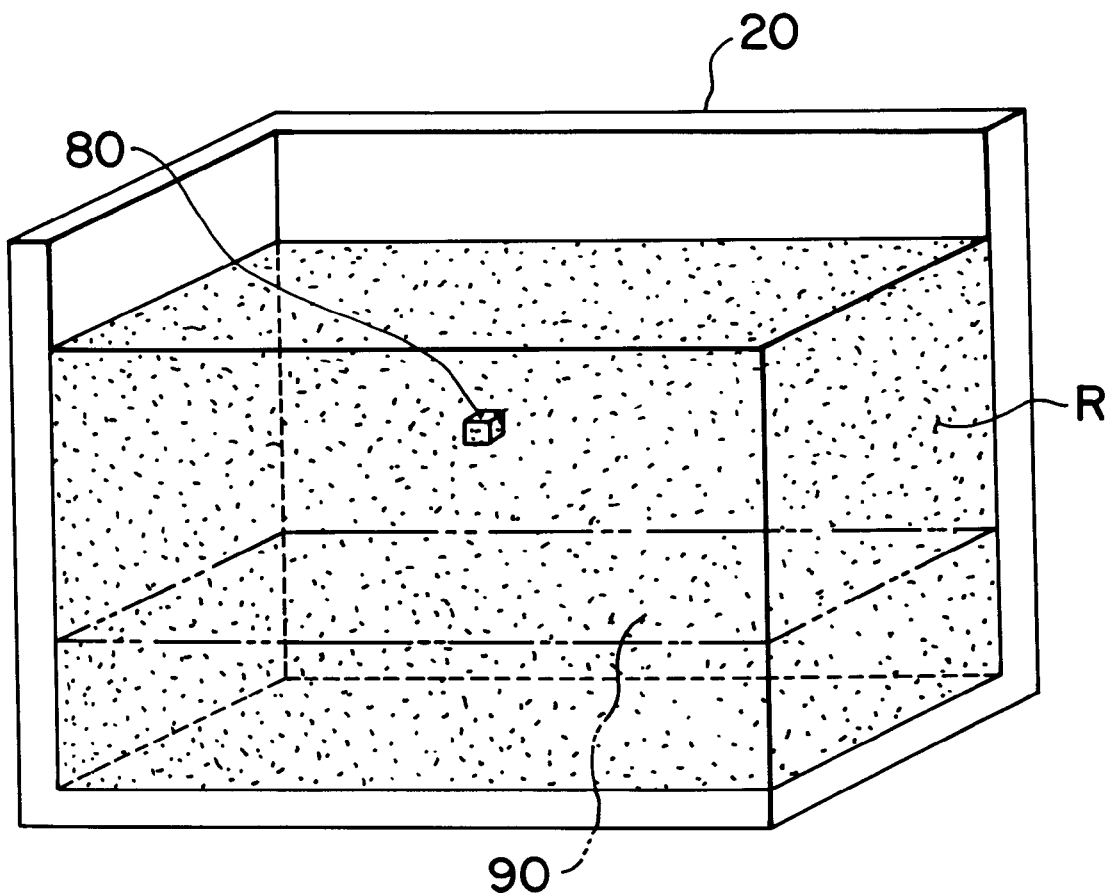
FIG. 3 is a schematic representation of a perspective view wherein a composition is filled into a container.

FIG. 3 is a perspective view showing the state where the composition R is filled in the container (20). In this figure, (80) indicates an imaginary cube which possesses a minute volume of the composition R and (90) is an imaginary horizontal plane in the composition R. A part of the side wall which makes up the container (20), the opening formed on the side wall, and the circulation means are omitted from the drawing.

Here, the density of the filler particles incorporated in the composition R (homogeneous dispersion condition) is indicated as "$\rho$" (g/cm3), the density of the filler particles in the vicinity of liquid surface of the composition R as "$\rho_1$" (g/cm3), and the density of the filler particles in the vicinity of the bottom of the composition R as "$\rho_2$" (g/cm3).

Sedimentation of the filler particles in the entire composition R contained in the container (20) can be deemed to be the result of the total of the movements of individual filler particles. With respect to the imaginary cube (80), inflow of the filler particles to the top surface of the imaginary cube (80) and outflow of the filler particles from the bottom thereof are occurring at the same time while the filler particles are sedimentating. Assuming that there are no significant changes in the characteristics of the composition R in the vicinity of this imaginary cube (80), the amount (weight) of the filler particles flowing into the imaginary cube (80) is equal to the amount (weight) of the filler particles flowing out of the imaginary cube (80), with no change in the amount (weight) of the filler particles existing in the imaginary cube (80). On the other hand, if the upper surface of the imaginary cube (80) is in contact with the liquid surface of the composition R, there are no filler particles flowing into the imaginary cube (80) through the upper surface and, therefore, the amount (weight) of the filler particles which are present in the imaginary cube (80) will decrease. On the contrary, if the lower surface of the imaginary cube (80) is in contact with the container (20), the filler particles will not flow out through the bottom, so that the amount (weight) of the filler particles which are present in the imaginary cube (80) will increase. The density of the filler particles in the middle of the container (20) is almost constant, while the density ($\rho_2$) of filler particles in the vicinity of the liquid surface decreases over time and ultimately there will be no filler particles existing at the liquid surface. Also, the density ($\rho_1$) of filler particles close to the bottom increases over time, finally producing sedimentation of the filler particles.

Based on this model, the amount (weight) of the filler particles sedimentated per unit time period, W (g/min), is determined by the following formula (1).

$$W = ws \qquad (1)$$

wherein w is the weight of the filler particles which pass through a unit area of the imaginary horizontal surface (90) per unit time (g/cm².min) and s is the area of the imaginary horizontal plane (90) (cm²).

If the filler particles of the composition are transported by the circulation means (60) in an amount of V(cm3/min) per unit time (circulation capacity), the amount of filler particles supplied per unit time to the upper part (close to the liquid surface) of the container is $\rho_2 \cdot V$ (g/min). Of this amount, the amount $\rho_1 \cdot V$ (g/min) is equivalent to the filler particles which have been present close to the liquid surface before the composition is transferred. Therefore, the actual amount of filler particles transported per unit time period, Wp (g/min), can be determined by the following formula (2).

$$Wp = (\rho_2 - \rho_1)V \qquad (2)$$

When a constant stationary state has been reached after operation of the circulation means (60), the weight W precipitated during a unit time period is equal to the actual transported weight Wp during a unit time period. Therefore, the relationship of the following formula (3) is satisfied.

$$W = Wp = (\rho_2 - \rho_1)V = ws \qquad (3)$$

On the other hand it is understood from the above-mentioned model that the decrease in the density $\rho_1$ of the filler particles in the vicinity of the liquid surface is equal to the increase in the density $\rho_2$ of the filler particles close to the bottom. Then, the density $\rho_1$ and $\rho_2$ are respectively expressed by the following formulas (4) and (5) using the deviation of density of filler from $\rho_0$.

$$\rho_1 = \rho_0 - \Delta\rho \qquad (4)$$

$$\rho_2 = \rho_0 + \Delta\rho \qquad (5)$$

Neither $\rho_1$ nor $\rho_2$ is less than 0 and is not more than he maximum value which depends on the kind of filler and the like.

The variable amount $\Delta\rho$, which shows the difference between $\rho_1$ and $\rho_2$, must be smaller than the allowable limit $\rho_t$ which is determined by the properties required for the formed objects such as high heat distortion temperature or high Young's modulus. The man skilled in the art can determine with some simple testing, which difference in density of particles is allowed to achieve appropriate properties. In this respect, it is in particular important to determine the required density of filler particles near the surface of the resin, as the surface layer yields a cured layer. With a defined $P_t$, the following formula (6) must be satisfied. Then, the following formula (7) is derived by applying the formula (6) to the above-mentioned formula (3).

$$\rho_t > \Delta\rho = (\rho_2 - \rho_1)/2 \qquad (6)$$

$$V > ws/2\rho_t \qquad (7)$$

As shown in the formula (7), the amount V of the composition transported by the circulation means (60) per unit time period (the circulation capacity) can be estimated from the weight w of the filler particles which pass through a unit area of the imaginary horizontal plane (90) per unit time (the sedimentation degree of the fillers), the area s of the imaginary horizontal plane (90) (the bottom area of the container (20)), and the allowable limit $\rho_t$ of the variable quantity of the density of the filler particles.

The transportation amount V estimated in this manner is a necessary minimum amount. This amount should preferably be set at about 2–5 times the amount of $ws/2\rho_t$. Specifically, when a composition comprising 100 parts by volume of a mixture consisting of 30–50 parts by volume of a photo-curable resin and a photopolymerization initiator and 50–70 parts by volume of inorganic fillers is filled into a container (20) with a bottom area of 300–20,000 cm², the amount V (cm³/min) transported by the circulation means (60) is in the range of 0.2 to $10^5$, preferably 2 to $10^4$, and more preferably 20 to 2,000.

The optical forming apparatus of the present invention has been described by way of a typical embodiment. The invention is not limited to this embodiment. Various modifications are possible. For example, (1) it is possible to place the circulation means of the photo-curable resin composition inside the container to make the size of the apparatus smaller, or (2) in addition to the circulation means, other means, for example, a stirring means, a convection means, or the like, may be used in combination to homogenize the photo-curable resin composition in the container. It is unnecessary to mention that the optical forming apparatus of the present invention can produce a three-dimensional object using a photo-curable resin composition which does not contain fillers.

EXAMPLES

<Preparation of photo-curable resin composition>

A resin composition was prepared by blending 50 parts by weight of SA-1002™ (a poly-functional monomer with a cyclic structure, manufactured by Mitsubishi Chemical Co., Ltd.), 25 parts by weight of FA-513A™ (a mono-functional monomer with a cyclic structure, manufactured by Hitachi Chemical Co., Ltd.), 25 parts by weight of N-vinyl pyrrolidone (mono-functional monomer), 0.25 part by weight of Irgacure 651™ (photopolymerization initiator manufactured by Ciba Geigy), and 0.1 part by weight of p-methoxy phenol (a stabilizing agent). 100 parts by volume of this resin mixture was mixed with 136 parts by volume of glass beads GB045ZC™ with a particle size distribution of about 5–65 µm (manufactured by Toshiba Balotini) to obtain a photo-curable resin composition.

<Example>

A three-dimensional object in the shape of a square column (100 mm×10 mm×height 60 mm) consisting of laminated layers (thickness of one layer: 200 µm) of cured resin was prepared using an optical forming apparatus of the present invention shown in FIG. 1 while operating the circulation means (60) over 12 hours. The size of the container (20) for the photo-curable resin composition was 20 cm×15 cm×10 cm. An argon laser emitter was used as the light source for the light source device (30), and a bellows-type pump was used as the circulating pump (61) for the circulation means (60). In this example, the weight w of the filler particles which pass through a unit area per unit time was 0.98 mg/min and the bottom area s of the container 20 was 300 cm². The variable limit $\rho_r$ of the density of filler was 3.6 mg/cm³. The variable limit $\rho_r$ is converted into a weight percentage of the filler of about 0.1%. Applying this data to the above-mentioned formula (7), the value of (ws/2 $\rho_r$) is about 41 cm³/min. The actual measured amount transported by the circulation means (60) in this example was about 140 cm³/min, about 3.4 times the value of (ws/2 $\rho_r$).

Test specimens were prepared from the lower part (at 5 mm from the edge of the object) which was formed at the initial stage of the optical forming operation and from the upper part (at 5 mm from the edge of the object) formed at the end of the optical forming operation. The weight percentage of the filler determined from the density, the modulus of elasticity, which is an index of physical characteristics, and the heat distortion temperature (HDT), which is an index of heat resistance, were measured. The results are shown in Table 1.

<Reference Example>

The optical forming was carried out in the same manner as in the Example, except that the circulation means (60) was not operated. The weight percentage of the filler and the modulus of elasticity and heat distortion temperature (HDT) were measured for the lower part and the upper part of the resulting three-dimensional object. The results are shown in Table 1 together with the results of the Example. In this Reference Example, at six hours after the start of the optical forming there was no filler existing in the composition close to the liquid surface (about 2 mm from the liquid surface) of the container (20) where cured resin layers were being formed.

TABLE 1

|  | Amount of Filler (wt %) | Young's Modulus (kg/mm²) | HDT (° C.) |
| --- | --- | --- | --- |
| Example |  |  |  |
| Lower part | 78.6 | 815 | 212 |
| Upper part | 78.5 | 805 | 208 |
| Reference Example |  |  |  |
| Lower part | 78.5 | 810 | 200 |
| Upper part | 0.9 | 190 | 110 |

As is clear from the results of Table 1, there is almost no difference in the amount of filler in the lower part and in the upper part of the three-dimensional object prepared in the Example. The three-dimensional object possessed excellent homogeneity, exhibiting superior physical characteristics and heat resistance over all parts. In contrast, the three-dimensional object which was produced in the Reference Example contained a smaller amount of the filler in the upper part and exhibited no favorable physical characteristics and heat resistance, indicating that the three-dimensional object produced in the Reference Example is inferior in homogeneity, exhibiting unevenness in physical characteristics and heat resistance in the various parts.

A homogeneous three-dimensional object exhibiting desired properties over all parts can be formed using the optical forming apparatus of the present invention, while effectively suppressing sedimentation of filler even though the filler is easily precipitated in a photo-curable resin composition.

We claim:

1. A process for forming a three dimensional object comprising the steps of
   (a) introducing an uncured layer of a liquid radiation-curable liquid resin composition in an optical forming apparatus;
   (b) selectively irradiating a selected area of the uncured layer of said radiation-curable resin composition according to slice shape data of a three-dimensional object, to cure the selected area of the resin composition;
   (c) repeating said introducing and irradiating steps, thereby obtaining a three dimensional object consisting of laminated layers of cured resin composition,
      wherein the radiation-curable resin composition comprises a filler with a density different from the resin, and
      wherein the radiation-curable resin composition is circulated by a circulation device at least for some time during said process at a rate of 2–5 times the amount of w.s/2$\rho_r$, wherein w is the weight of filler particles which pass through a unit area of an horizontal plane (90), s is the area of the horizontal plane (90) and $\rho_r$ is the limit value of an allowable difference in density of the filler particles dispersed in the composition.

2. A process for forming a three-dimensional object according to claim 1, wherein the circulation device comprises a circulating pump.

3. A process according to claim 2, wherein the means for circulating comprises a bellows-type pump, a diaphragm pump or circumferential piston.

4. A process for forming a three-dimensional object according to claim 1 wherein the forming apparatus is provided with a control means for actuating or stopping the circulation device.

5. A process according to claim 4, wherein the control means (70) comprises a computer to control operations of the light source device (30) (lighting-extinction-scanning-stopping), the stage (40) (rise-descent-stopping), the wiping mechanism (50) (actuation-stopping), and the circulation device (60) (actuation-stopping).

6. A process according to claim 1, wherein the circulation device is able to transport the liquid curable resin composition at a rate of about 0.2 to $10^5$ cm$^3$/min.

7. A process according to claim 1, wherein the radiation-curable resin composition comprises at least one radiation curable monomer or oligomer and further comprises at least one photoinitiator.

8. A process according to claim 1, wherein the filler comprises at least one inorganic powdery or fibrous filler.

9. A process according to claim 1, wherein the filler has an average particle size or average fiber length of about 1–50 μm.

10. A process according to claim 1, wherein an amount of the filler is in a range of 50–200 parts by volume for 100 parts by volume of the radiation-curable resin composition.

11. An apparatus for preparing a three-dimensional object by a sequential build-up and cure of layers of a liquid radiation-curable composition comprising:

a storage container for holding said liquid radiation-curable composition;

a movable stage device vertically moveable through said container and through said liquid radiation-curable composition which, by said vertical movement, allows said liquid radiation-curable composition to form layers of uncured composition, each layer of which, upon radiation-cure of a selected area thereof, becomes part of said three-dimensional object;

a wiping device for making surfaces of said uncured layers of radiation-curable composition substantially flat and smooth;

a radiation source for effecting cure of said layers of liquid radiation-curable composition; and a circulation device for increasing homogeneity among different parts of said liquid radiation-curable composition in said container;

the circulation device being capable of circulating the composition at least for some time during the forming process at a rate of 2–5 times the amount of w.s/$\rho_r$ wherein w is weight of filler particles which pass through a unit area of an horizontal plane (90), s is area of the horizontal plane (90) and $\rho_r$ is a limit value of allowable difference in density of the filler particles dispersed in the composition.

\* \* \* \* \*